United States Patent
Harrington et al.

(10) Patent No.: US 9,250,143 B2
(45) Date of Patent: Feb. 2, 2016

(54) MULTICAPACITOR FORCE/MOMENT SENSOR ARRAYS

(71) Applicants: Richard H. Harrington, Dexter, MI (US); Michael G. Leydet, St. Clair Shores, MI (US)

(72) Inventors: Richard H. Harrington, Dexter, MI (US); Michael G. Leydet, St. Clair Shores, MI (US)

(73) Assignee: College Park Industries, Inc., Warren, MI (US)

( * ) Notice: Subject to any disclaimer, the term of this patent is extended or adjusted under 35 U.S.C. 154(b) by 54 days.

(21) Appl. No.: 13/622,630

(22) Filed: Sep. 19, 2012

(65) Prior Publication Data

US 2014/0076066 A1    Mar. 20, 2014

(51) Int. Cl.
   *G01L 1/14*    (2006.01)
   *G01L 5/16*    (2006.01)

(52) U.S. Cl.
   CPC ............... *G01L 1/142* (2013.01); *G01L 1/144* (2013.01); *G01L 1/146* (2013.01); *G01L 5/165* (2013.01)

(58) Field of Classification Search
   CPC ......... G01L 1/142; G01L 5/165; G01L 1/146; G01L 1/144
   USPC ............................... 73/862.636, 780; 369/43
   See application file for complete search history.

(56) References Cited

U.S. PATENT DOCUMENTS

| | | | |
|---|---|---|---|
| 4,322,836 A * | 3/1982 | Kinjo et al. ................. 369/43 |
| 5,101,669 A * | 4/1992 | Holm-Kennedy et al. ................. 73/862.626 |
| 6,367,326 B1 * | 4/2002 | Okada ................. 73/504.12 |
| 6,532,824 B1 * | 3/2003 | Ueno et al. ................. 73/780 |
| 7,343,813 B1 | 3/2008 | Harrington |
| 7,958,789 B2 * | 6/2011 | Hayakawa et al. ....... 73/862.626 |
| 8,189,300 B1 * | 5/2012 | Bonin ................. 73/780 |
| 8,272,267 B2 * | 9/2012 | Tamura et al. ............. 73/504.12 |
| 2002/0130673 A1 * | 9/2002 | Pelrine et al. ................. 324/727 |
| 2003/0133372 A1 * | 7/2003 | Fasen et al. ................. 369/43 |
| 2003/0169056 A1 * | 9/2003 | Hasegawa et al. ............. 324/661 |
| 2005/0005703 A1 * | 1/2005 | Saito et al. ................. 73/780 |
| 2007/0257821 A1 * | 11/2007 | Son et al. ................. 341/22 |
| 2008/0074098 A1 * | 3/2008 | Vranish ................. 324/76.11 |
| 2008/0087069 A1 * | 4/2008 | Renken et al. ................. 73/1.63 |
| 2008/0250864 A1 * | 10/2008 | Shipton ................. 73/780 |
| 2009/0249885 A1 * | 10/2009 | Shkel et al. ................. 73/780 |
| 2010/0033196 A1 * | 2/2010 | Hayakawa et al. ............ 324/686 |
| 2010/0058865 A1 * | 3/2010 | Zhang et al. ................. 73/514.38 |
| 2010/0132463 A1 * | 6/2010 | Caminada et al. .......... 73/504.12 |
| 2010/0162832 A1 * | 7/2010 | Brauers ................. 73/862.626 |
| 2010/0236327 A1 * | 9/2010 | Mao ................. 73/504.12 |
| 2010/0263446 A1 * | 10/2010 | Tamura et al. ............. 73/504.12 |
| 2011/0210721 A1 * | 9/2011 | Cochran ................. 324/207.16 |
| 2012/0193694 A1 * | 8/2012 | Suzuki et al. ................. 257/296 |

* cited by examiner

*Primary Examiner* — Lisa Caputo
*Assistant Examiner* — Philip Cotey
(74) *Attorney, Agent, or Firm* — Dinsmore & Shohl LLP

(57) ABSTRACT

A multicapacitor sensor system facilitates the measurement of applied shear and moment forces. In one disclosed configuration, moments may be detectable in x, y and z directions, resulting in a full, 3-axis load cell with 6 degrees of freedom. The system may further include electrical circuitry to generate electrical drive pulses, sense amplify and buffer the voltages induced on the sense plates, and compute applied forces. An array of multicapacitor sensors that can be addressed individually without cross-talk and globally produce a map of forces and moments applied to the whole array. A MEMS implementation enables in vivo application.

18 Claims, 21 Drawing Sheets

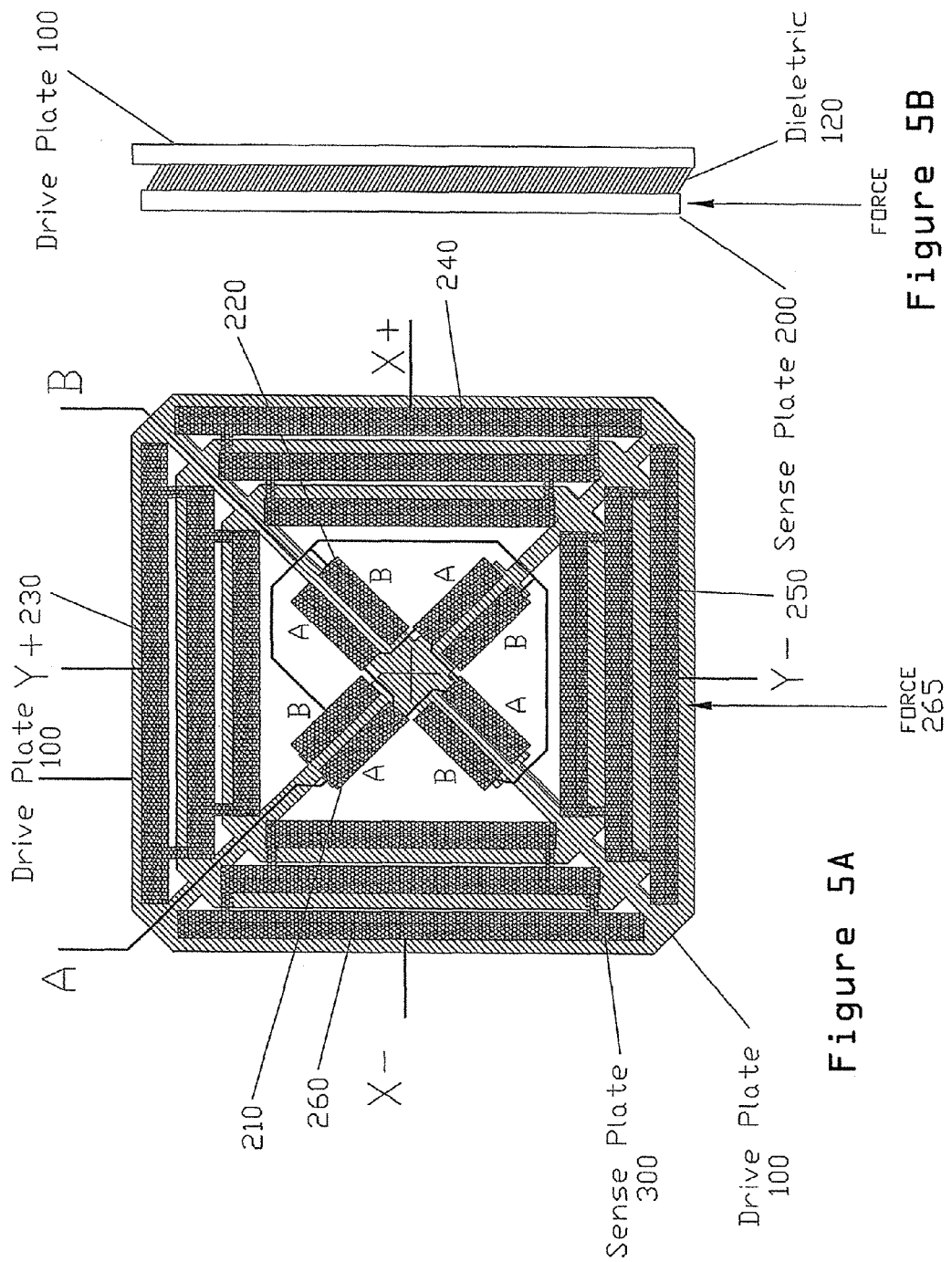

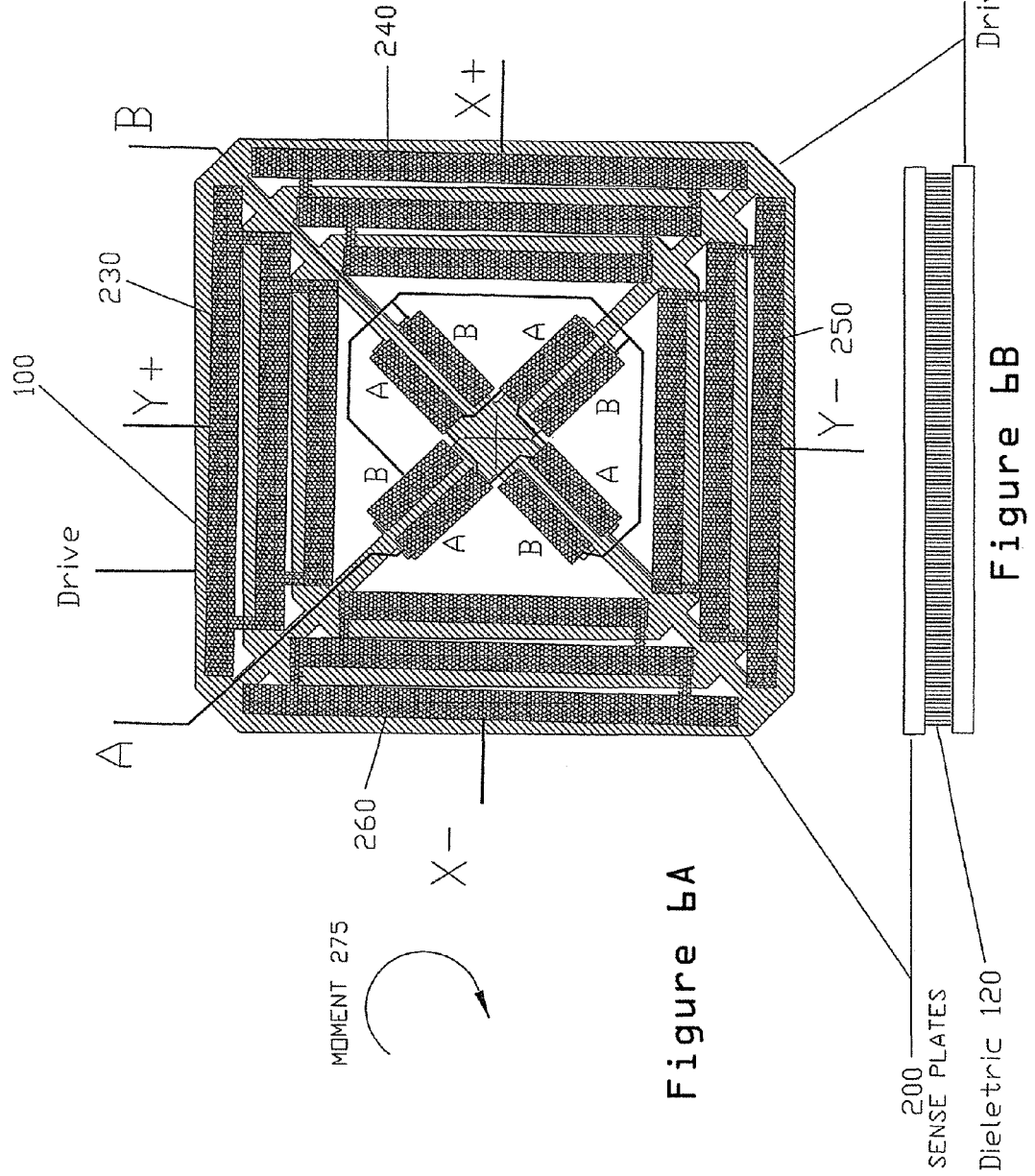

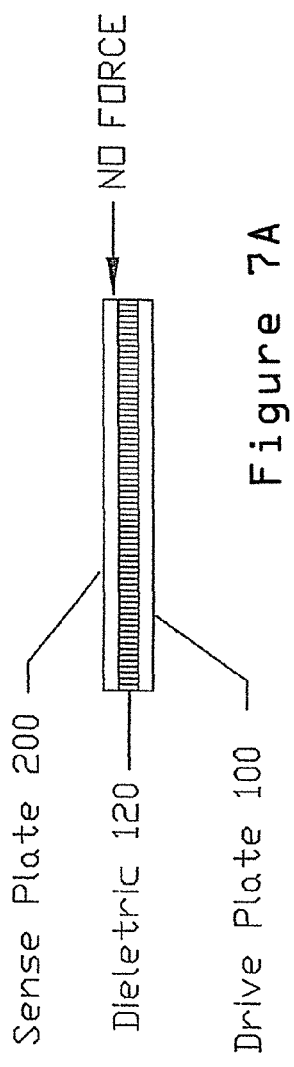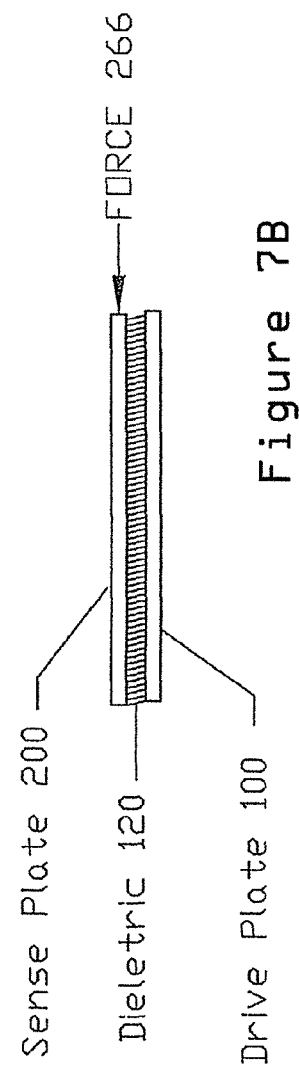

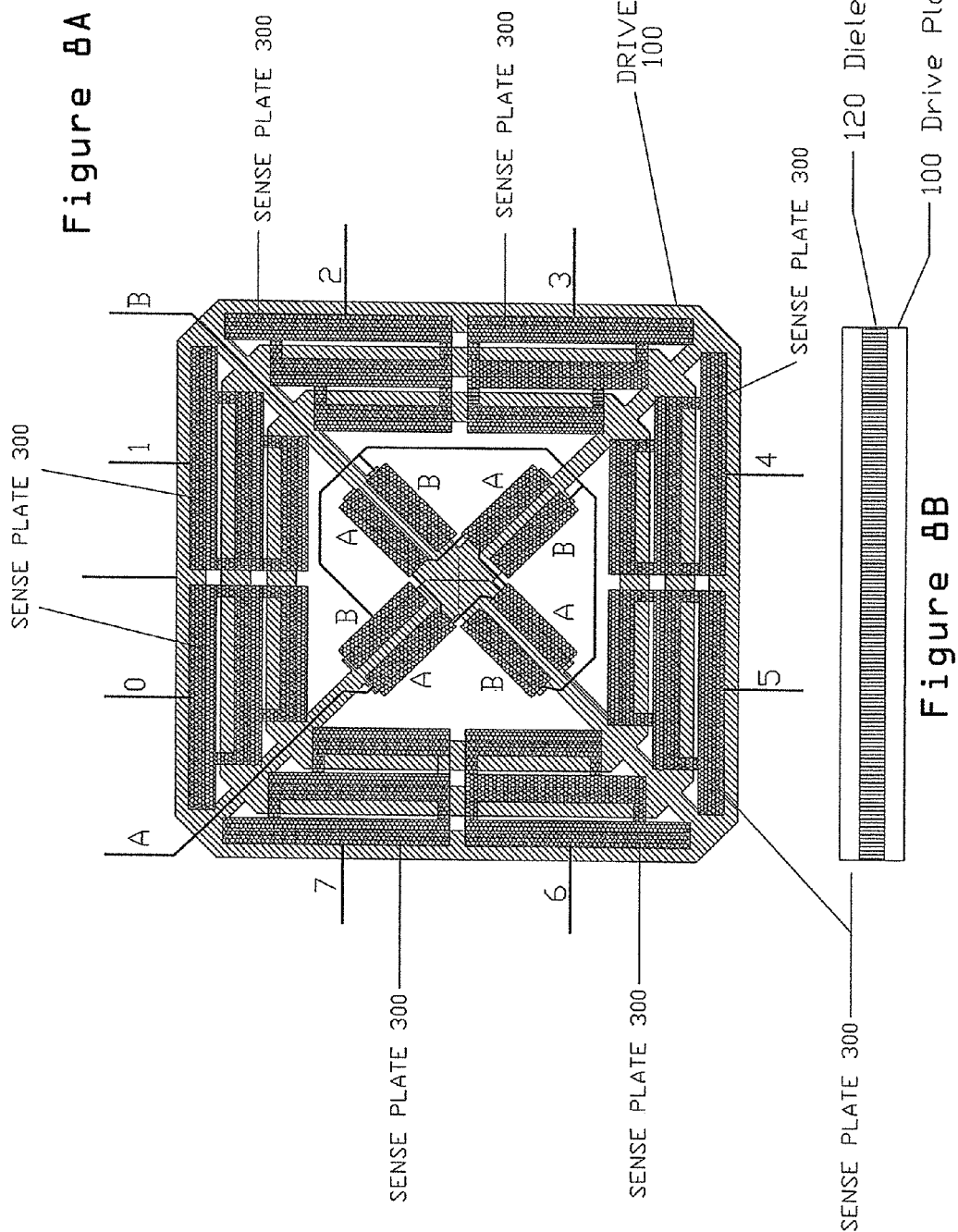

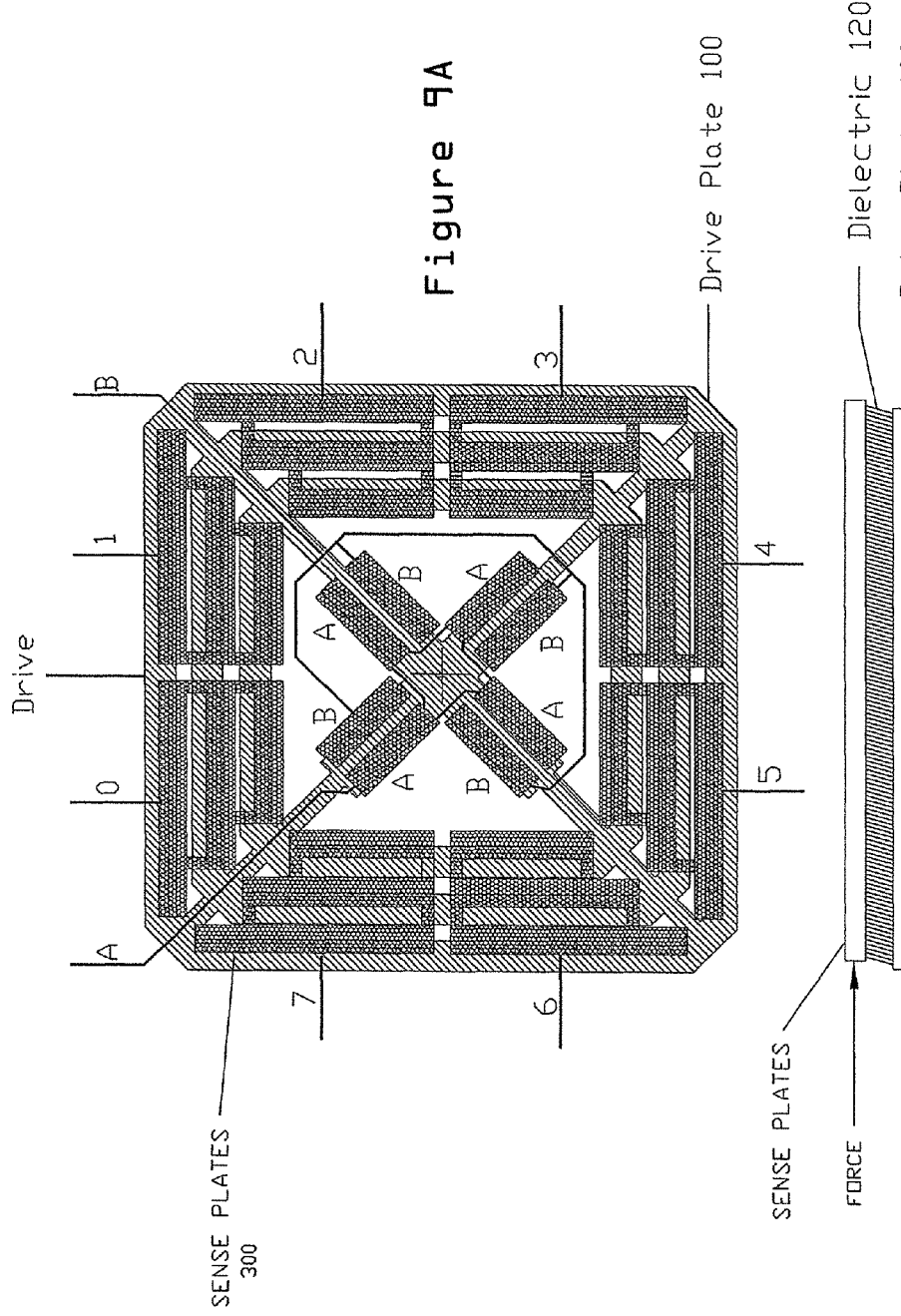

MULTICAPACITOR FORCE/MOMENT SENSOR ARRAYS

FIELD OF THE INVENTION

This invention relates generally to multicapacitor sensor arrays and, in particular, to arrays that enable the sensing of forces and moments.

BACKGROUND OF THE INVENTION

U.S. Pat. No. 7,343,813, the entire content of which is incorporated herein by reference, describes a capacitive sensor array comprising a first and second plurality of parallel conductors separated by a compressible insulator. The second plurality of conductors are paired to partially overlap the first plurality of conductors, in two-by-one sets, whereby a force applied in a plane parallel to the conductor array will cause capacitance between the first and second conductors to change. In this context, "force" and "shear force" are interchangeable, and are defined as force(s) parallel to the X and Y planes. "Torque" and "moment(s)" are also interchangeable.

In accordance with the '813 patent, serially sampling the two-by-one conductor sets for changes in capacitance provide information on both the magnitude and direction of the force. In addition, forces applied perpendicular to the planes causes the insulator to compress, thus also changing the capacitances of the two-by-one sets of the sensor array. The imbalance of voltages between the paired conductors is applied to amplifier to sense force magnitude and direction. An embedded computer implements different functions to calculate the forces and moments. Compression force appears as an increase in peak voltage magnitude in both of the paired conductors.

While the configuration just described enables the detection of lateral force in X, Y and compression along the Z axis, the layout does not facilitate the sensing of all six components of the various forces and moments.

SUMMARY OF THE INVENTION

This invention resides in a multicapacitor sensor system facilitating the measurement of applied force and moments. In one preferred embodiment, moments are detectable in x, y and z, resulting in a full, 3-axis load cell with 6 degrees of freedom.

The system comprises a drive plate defining an electrically conductive pattern having a center point, the pattern including at least two orthogonal electrodes and at least one electrode extending radially outwardly from the center point. An electrically conductive sensor pattern aligned with the drive pattern includes at least one electrode parallel to each of the orthogonal electrodes and at least two electrodes parallel to each electrode extending radially outwardly from the center point.

A compressible, elastic dielectric material separates the drive and sensor patterns such that the drive and sensor patterns and dielectric define a two-dimensional plane with X and Y directions and a Z direction perpendicular to the plane. Given this structure, forces applied in the X and Y directions may be detected by changes in the capacitance between the orthogonal electrodes of the drive plate pattern and the electrodes of the sense plate pattern parallel to the orthogonal electrodes.

A moment applied to the system around the Z direction may be detected by changes in the capacitance between the electrode extending radially outwardly from the center point of the drive plate pattern and the electrodes of the sense plate pattern parallel to the electrode extending radially outwardly. In the preferred embodiments, the drive plate pattern includes a plurality of orthogonal electrodes forming a plurality of generally square rings around the center point, and a plurality of orthogonal electrodes extending radially outwardly from the center point forming a cruciate shape.

The system may further include electrical circuitry operative to generate electrical pulses to drive the drive plate, sense and buffer the voltages induced on the sense plates, compute changes in the capacitances between the drive and sense plate patterns, and determine if any forces or moment(s) have been applied to the system as a function of the changes in the capacitances.

To achieve a 3-axis load cell with 6 degrees of freedom, the electrodes of the sense plate pattern parallel to each of the orthogonal electrodes of the drive plate pattern may be formed with a plurality of segments enabling X, Y and Z forces and moments to be measured. In this case, at least eight electrodes of the sense plate pattern are parallel to the various orthogonal electrodes of the drive plate pattern, resulting in a total of at least 10 separate electrically conductive nodes in the sense plate pattern.

The technology may also be utilized in a MicroElectroMechanical System (MEMS) based configurations enabling extremely small and hermetically sealed configurations adapted for placement in harsh environments and in vivo applications.

BRIEF DESCRIPTION OF THE DRAWINGS

FIG. 5A depicts the application of a force in the Y direction;

FIG. 5B side-view cross-section of the structure of FIG. 5A;

FIG. 6A depicts the application of a clockwise Z moment;

FIG. 6B side-view cross-section of the structure of FIG. 6A;

FIG. 7A is a cross section that shows the drive and sense plates separated by a dielectric material with both no force applied;

FIG. 7B is a cross section that shows the drive and sense plates separated by a dielectric material with force applied in the X direction;

FIG. 8A is a drawing that shows an alternative embodiment of the invention that achieves a full 3-axis load cell with 6 degrees of freedom with no force or moments applied;

FIG. 8B side-view cross-section of the structure of FIG. 8A;

FIG. 9A depicts the application of a force in the X direction of the full 3-axis load cell with 6 degrees of freedom sensor;

FIG. 9B side-view cross-section of the structure of FIG. 9A;

DETAILED DESCRIPTION OF THE INVENTION

Figure 1:
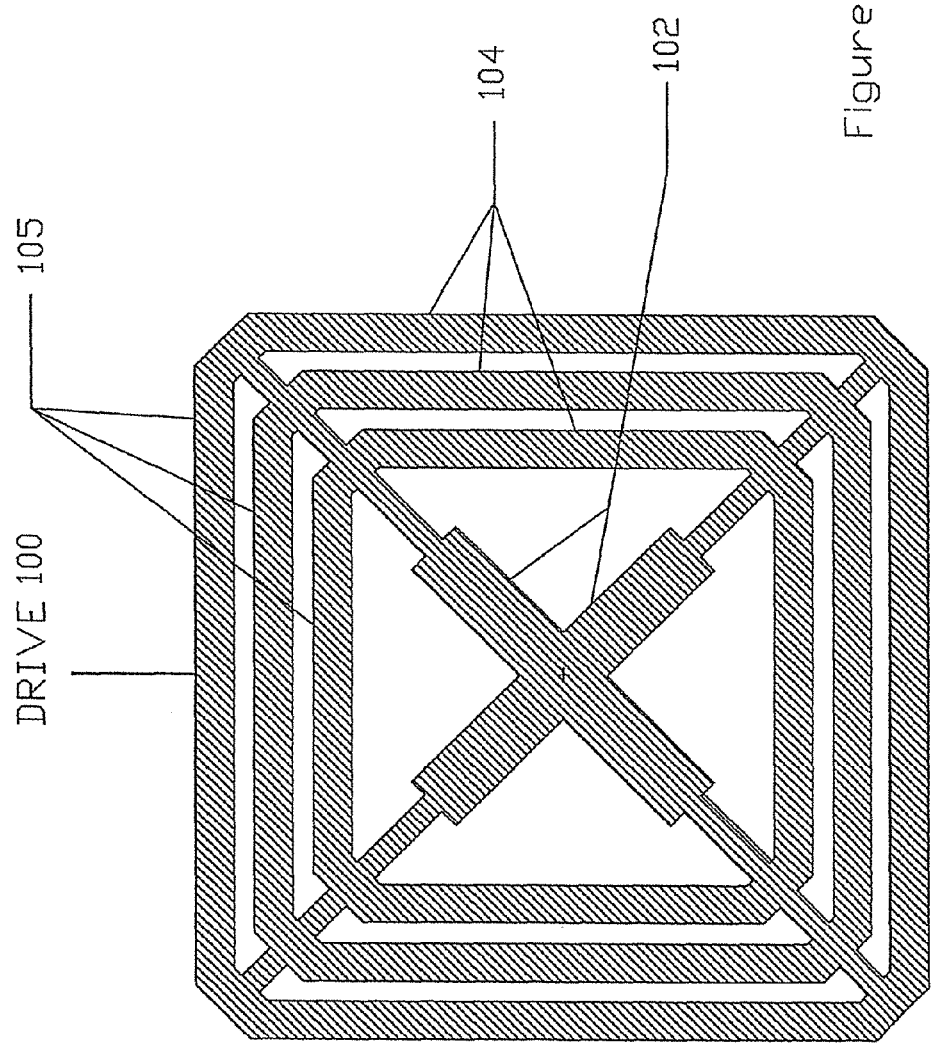
FIG. 1 is a drawing that illustrates a drive plate according to the invention.
Figure 3:
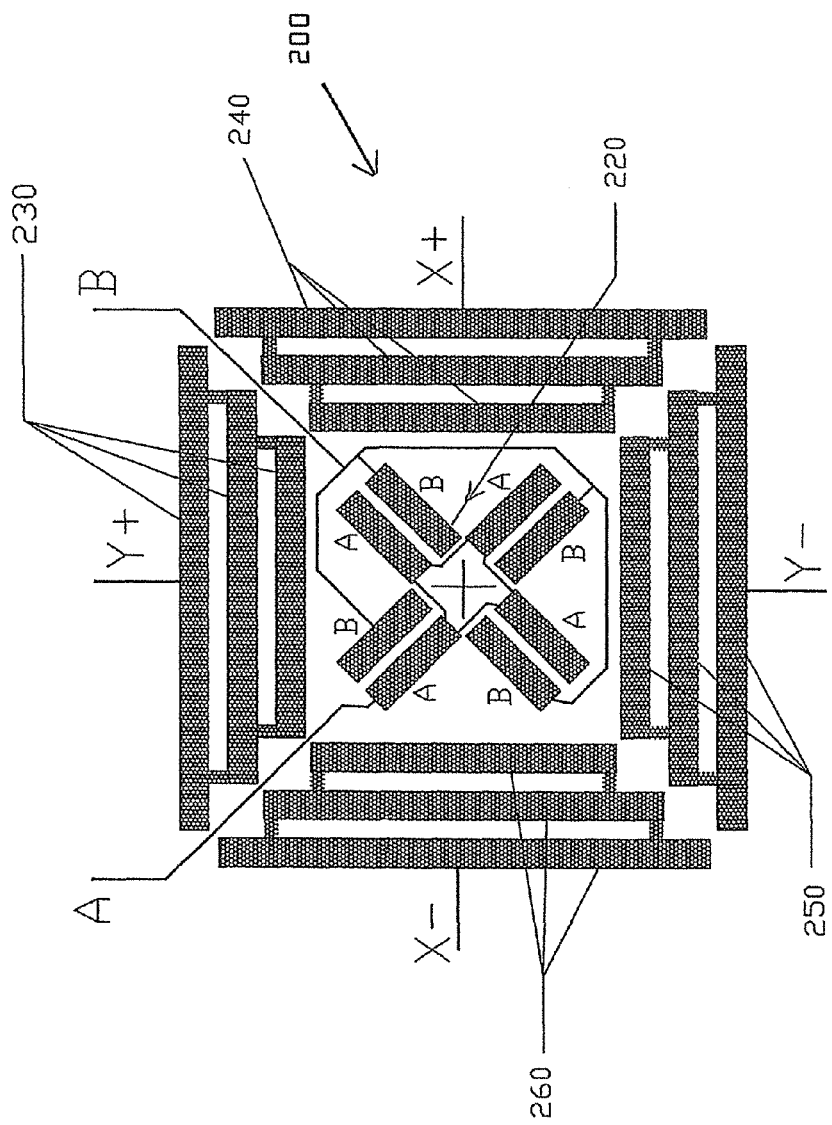
FIG. 3 is a drawing that illustrates a plurality of sense plates according to the invention that can sense X, Y and Z forces and Z moments.

In this description, as with the '813 patent discussed in the Background of the Invention, a "torque" will be synonymous with a moment, and "shear force" will be synonymous with force. FIG. 1 is a drawing that illustrates a drive plate 100 constructed in accordance with the invention with 104 referencing vertical drive plates, 105 referencing horizontal drive plates, and 102 referencing a central, cruciate arrangement of drive elements. FIG. 3 is a drawing that illustrates a sense plate assembly 200 constructed in accordance with the invention. When positioned in overlying registration with the drive plate of FIG. 1, and separated by a dielectric material, the structure can be used to sense X, Y and Z forces and a Z moment, as described in further detail herein.

In FIG. 1, the central cruciate shape 102 shares a common electrical connection with the surrounding rings formed by vertical and horizontal elements 104, 105. While three generally square rings are shown, it will be appreciated that more or fewer such rings may be used and may be implemented in different shapes, including rectangular and even circular though other shapes may complicate the processing electronic described herein below.

In FIG. 3, the individual sense plates of the assembly 200 comprise include a central, cruciate arrangement 220 of split electrodes labeled A, B, with all the A plates being connected together, and all the B plates being connected together. The sense plates further include four sets of X, Y plate arrangements 240, 260, 230, 250 sharing common electrical connections labeled X+, X−, Y+, and Y−, respectively. Each of these four split electrodes are in physical alignment with the four arms of the drive plate 102 depicted in FIG. 1, as are the vertical and horizontal electrodes that make up the X and Y plate arrangements. If there are more or less elements in the drive plate arrangement, or if the elements are of a different geometric shape, the number and shape of the elements in the sense plate arrangement will likewise correspond.

Figure 2:
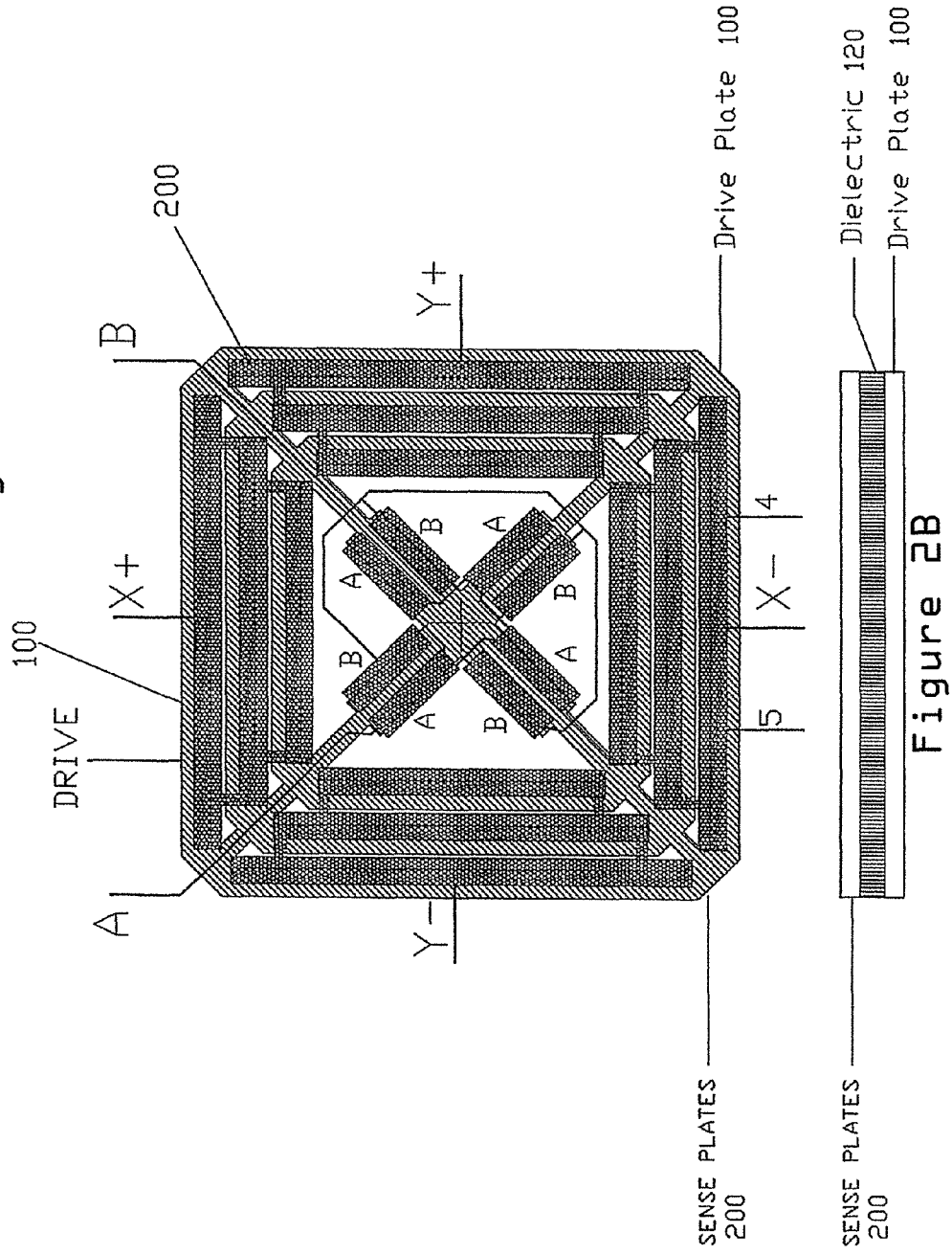
FIG. 2A is a combined view showing the juxtaposition of the drive plate of FIG. 1 and the sense plates of FIG. 3 with no applied force.
FIG. 2B side-view cross-section of the structure of FIG. 2A.

FIG. 2 is a combined view showing the juxtaposition of the drive plate of FIG. 1 and the sense plates of FIG. 3 with no applied force. FIG. 7 is a cross section that shows the drive and sense plates separated by a dielectric material. The top view, FIG. 7A, shows the cross section with no force applied, and the bottom view, FIG. 7B, shows an X force 266 applied, causing a lateral (shear) movement to occur. Note that while certain figures (i.e., FIGS. 1-3) show a single capacitive unit cell, it will be appreciated that a plurality of such cells may be implemented as an array of any practical size, preferably sharing a common sheet of dielectric material.

In all embodiments, either or both of the drive and sense plates may be deposited directly onto the dielectric material. Alternatively, either or both may be printed on a flexible substrate such as polyester or a rigid substrate such as FR4 PC board material where it they would commonly be etched copper, with or without gold plating. The various electrodes may be implemented as a metal layer such as copper, or as a conductive ink containing silver, gold, carbon, or any other appropriate, electrically conductive material(s). The dielectric is preferably "perfectly" elastic to shear and to normal compression forces. Materials which approximate this desirable characteristic include natural and synthetic rubbers, latex, polyisoprene, urethane, silicone rubber and other compressible materials.

As an alternative to conductive ink being applied to a material such as polycarbonate to form the drive and sense plates, the use of vapor deposition of a conductor such as, but not limited to, aluminum can be used to form the drive and sense plates. A sheet of polycarbonate, silicone or other suitable insulating film or sheet is coated with a thin layer of a conducting material such as aluminum using vapor deposition on one side of the material. This layer is typically 400 angstroms but may be thicker or thinner to get a consistent coating with few or no pin holes. After the material is coated, selective removal of material is done using a chemical photo etching process to form the drive or sense plates. Artwork of the drive or Sense plates is used to create a mask that is applied to the conductive side of the material. The material is then subjected to a chemical solution that etches away all the conductive material that is not covered by the mask. The results of this process are an insulator with a conductive pattern of either the drive plate, or the sense plate. The drive and sense plates are then bonded to the compressible dielectric material to complete the sensor.

Regardless of the movement to be detected, either or both of drive and sense plates may move, as it is the relative direction and magnitude which are sensed. Assuming the dielectric material is "perfectly elastic," capacitance will change linearly with applied X and Y force. This can be calculated using the standard capacitance formula $C=(K*Eo*A)/D$ where:

$Eo=8.854*10^{-12}$ (Metric Units)

K is the dielectric constant of the material,

A is the overlapping surface of the plates,

D is the distance between the plates, and

C is the capacitance.

Due to the fact that the overlap area is in the numerator, C will be proportional to A. When a Z force is applied, a non-linear capacitance change will occur because D is in the denominator, as D goes to 0 as a limit, C will go to infinity. This may be solved with a 3-order polynomial curve fit.

Figure 4A:
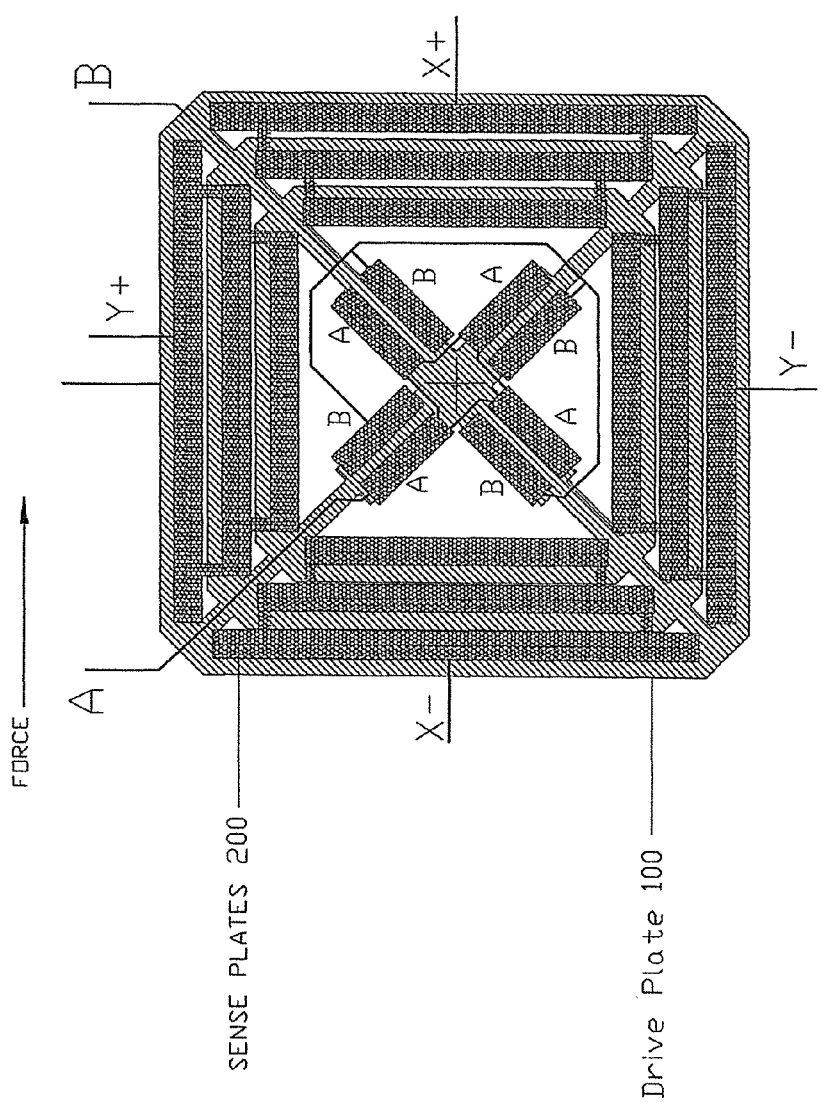
FIG. 4A depicts the application of a force in the X direction.
Figure 4B:
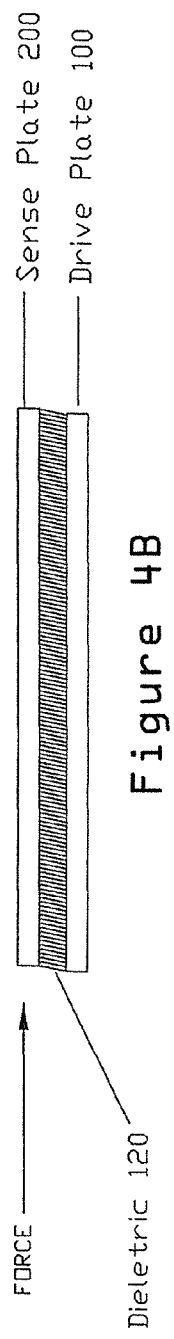
FIG. 4B side-view cross-section of the structure of FIG. 4A.
Figure 10:
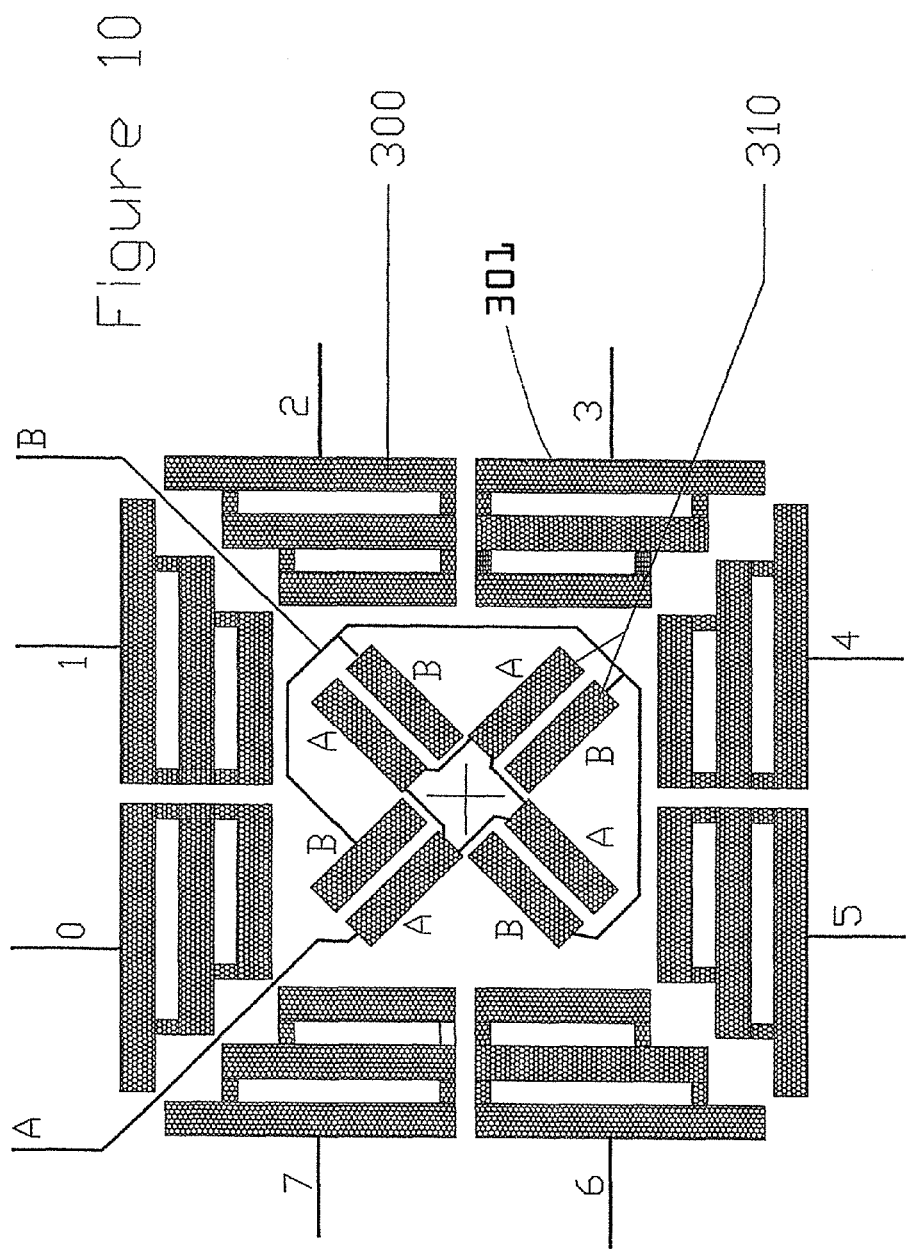
FIG. 10 illustrates the sense plates cut into two electrically separate pieces, the resultant structure being able to sense to sense X, Y and Z forces and moments.

FIG. 4 depicts the application of a force in the X direction, which is sensed by the difference in capacitance between the drive plate 100 and X+ and X− sense plates 200. In particular, in this case, the difference in capacitance between the drive plate and X+ sense plate is now greater than the capacitance between the drive plate and X− sense plate. FIG. 5 depicts the application of a force 265 in the Y direction. In this case, the capacitance between the drive plate 100 and Y− 250 is now greater than the capacitance between the drive plate and Y+ 230. FIG. 6 shows how a Z moment 275 (twist) will affect the sense plates A and B in relationship to the drive segments that the sense plates A and B straddle. In this case, the "A" sense plates now overlap the drive plates more than the "B" sense plates.

Figure 12:
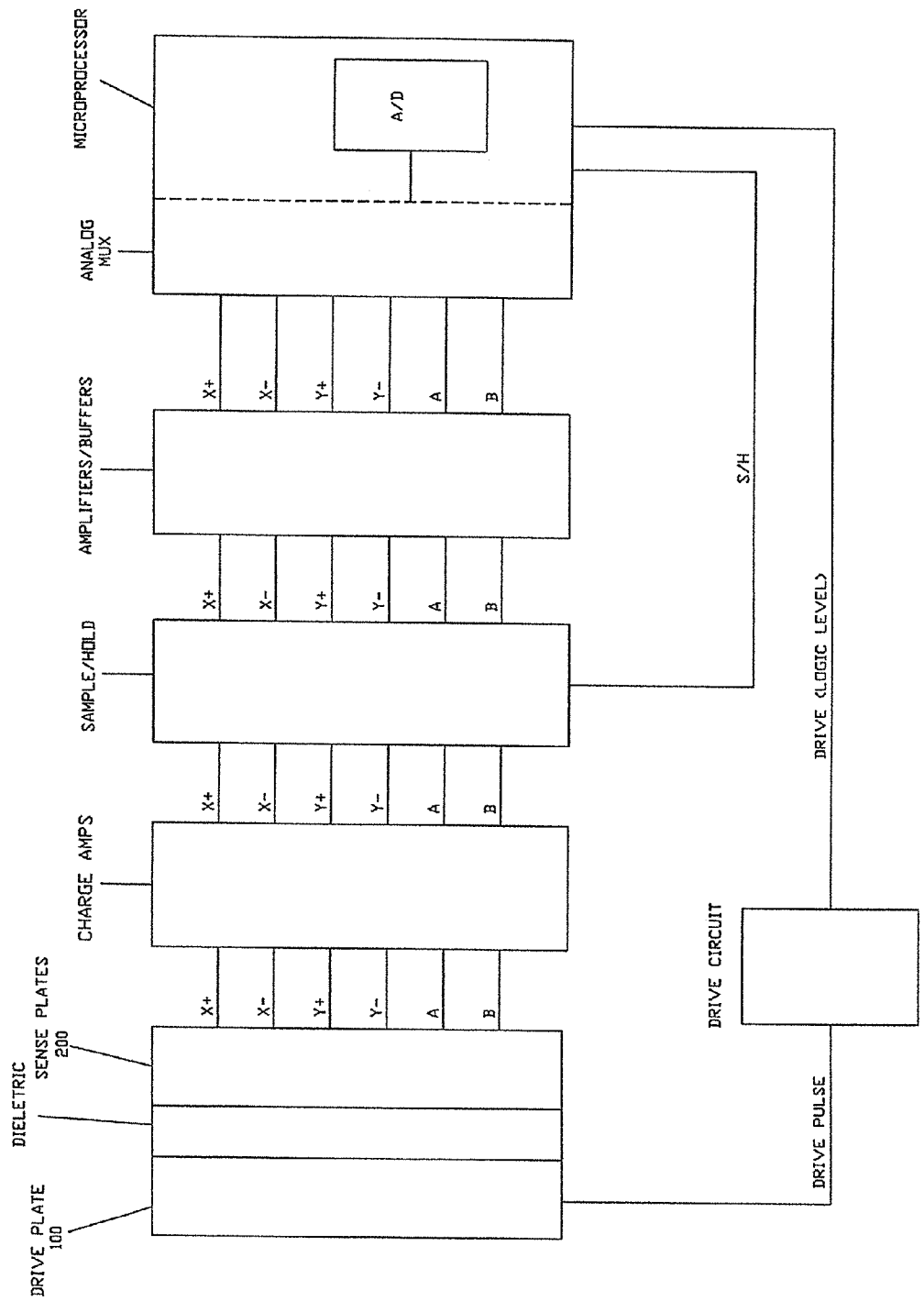
FIG. 12 is a simplified block diagram depicting important circuits associated with the operation of the invention that can sense the various forces and a single moment.

FIG. 12 is a simplified block diagram depicting important circuits associated with the operation of the invention that can sense the various forces, and a single moment, MZ, in conjunction with the cell shown in FIGS. 2 and 4-6. In an array of such cells, all of the electrodes associated with the sense plates sharing a common electrical interconnection are fed to separate charge amplifiers; that is, all of the "A" segments are connected to a charge amplifier, all of the "B" segments are connected to a different charge amp, and so on.

In FIG. 12, the charge amp outputs are connected to sample-and-hold (S/H) blocks which, in turn, feed the buffer amps. The outputs of the buffers are delivered to an analog multiplexer which, as shown in the diagram, may form part of the microcontroller responsible for overall operation. In the case of an array of drive and sense plates, there will be multiple drive signals, each of which go to a single drive plate. Only one drive signal will be present at any one point in time. In this way, the sense signals may be common as discussed above.

FIGS. 8-11 are drawings that show an embodiment of the invention that achieves a full 3-axis load cell with 6 degrees of freedom. FIG. 8 illustrates the overlap between the drive and sense plates without an applied force, and FIG. 9 shows the application of a shear force in the X direction. X, Y forces are detected and computed in the same manner as the embodiment of FIGS. 1-7. However, in this embodiment, the sense plates (FIG. 10) are divided into two electrically separate pieces 300, 301 thereby enabling the resultant structure to sense moments.

Figures 11A, 11B:
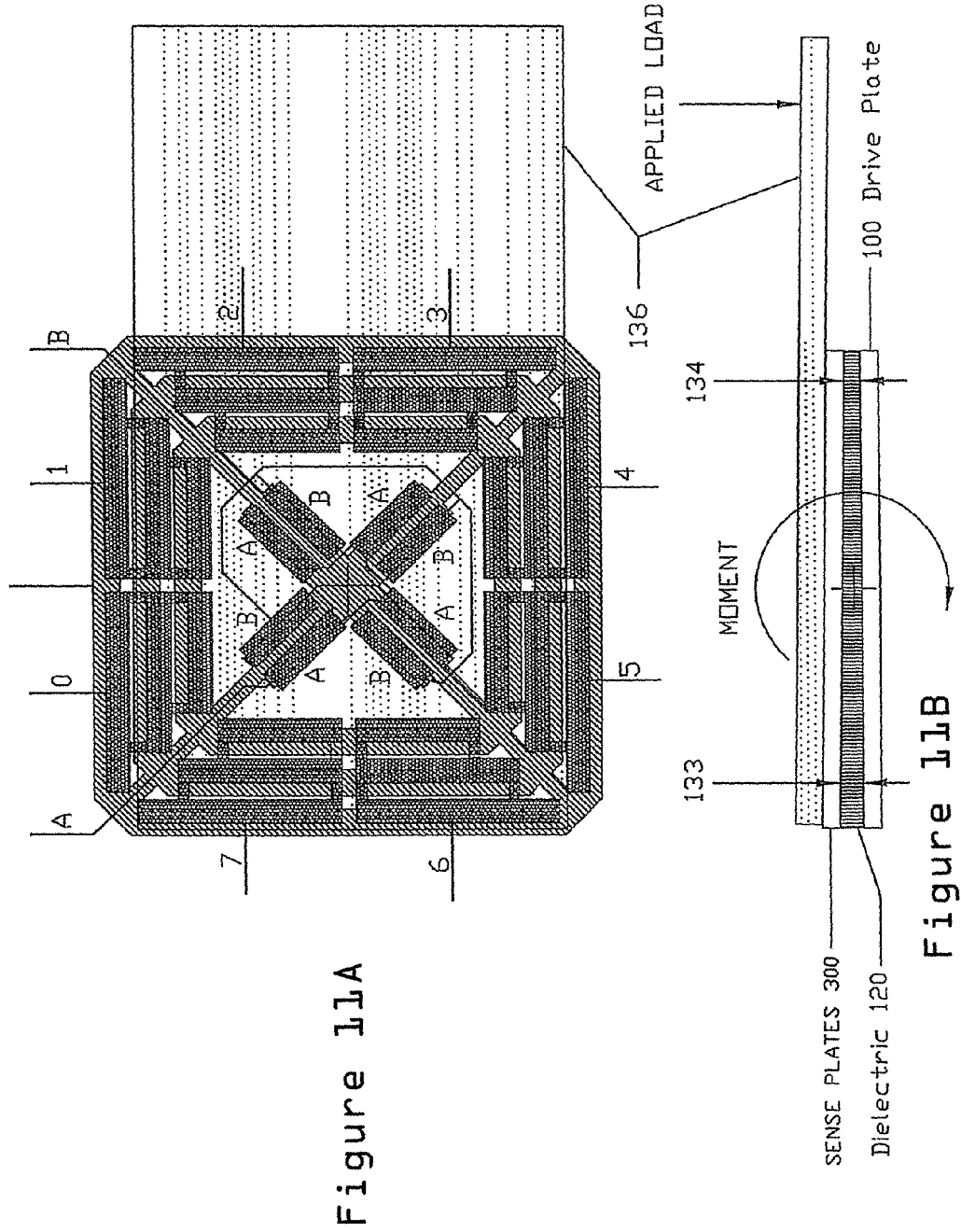
FIG. 11A is a top-down view of a cell that can differentiate an applied load causing a moment as opposed to a lateral force.
FIG. 11B is a cross section of the structure of FIG. 11A.

In particular, FIG. 11 illustrates how, with an applied load, the plates 1 and 4 are closer to the drive plate than sense plates 0 and 5. This moment can be differentiated from force because in force, since plates 0, 1, 4 and 5 will have equal capacitance. FIG. 11A is a top-down view and FIG. 11B is a cross section. With the moment applied as shown in FIG. 11 to the sense plate at 136, plates 1, 2, 3 and 4 will have a higher capacitance than plates 0, 5, 6 and 7. Complex moment and shear forces can be detected as well by receiving signals from all the sense plates and using a calibration matrix to separate forces from moments.

Figure 13:
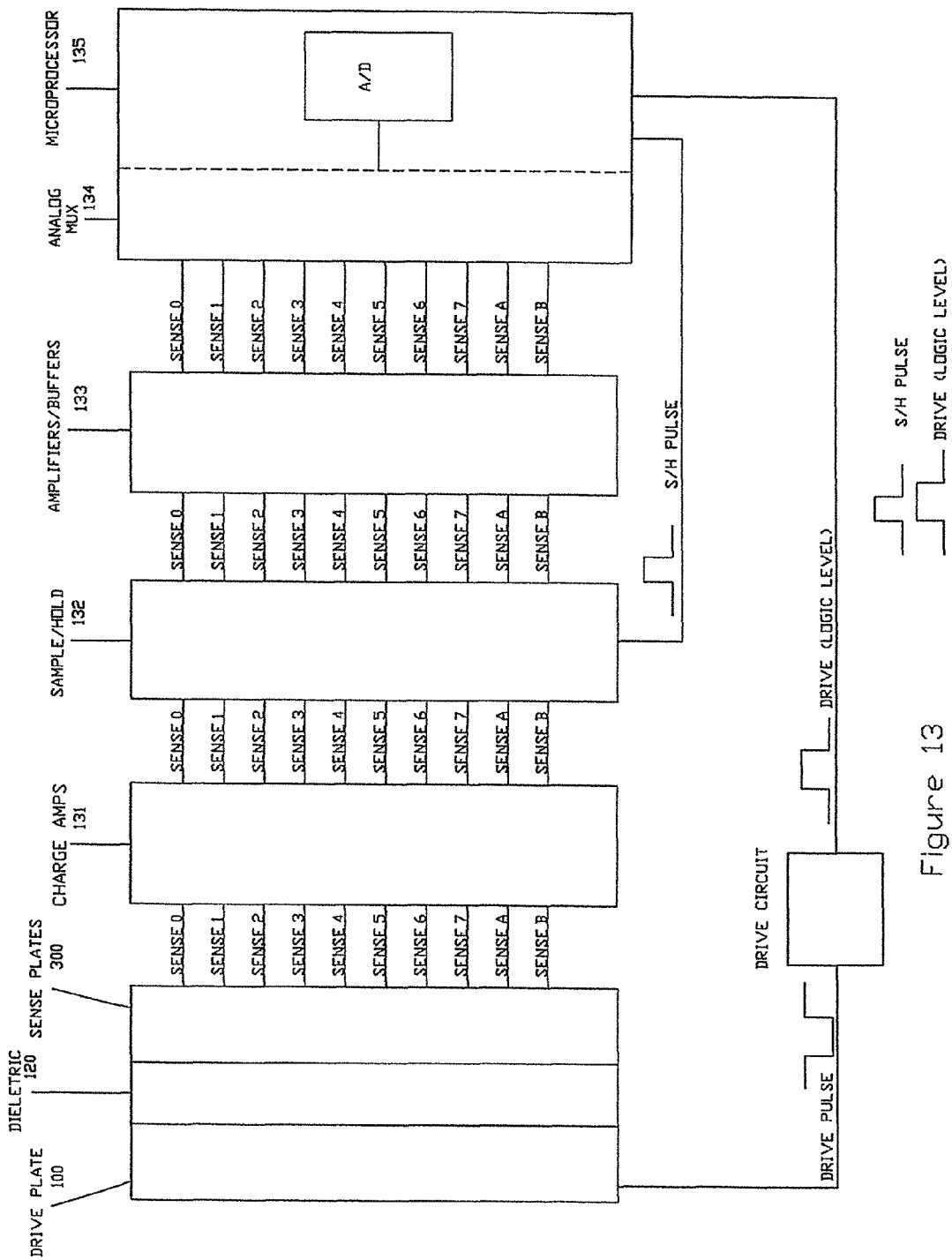
FIG. 13 is a block diagram of the full, 3-axis sensor with 6 degrees of freedom to which one or more of the cells of FIGS. 8-11 would be incorporated.

FIG. 13 is a block diagram of the full, 3-axis sensor with 6 degrees of freedom to which one or more of the cells of FIGS. 8-11 would be incorporated. A single drive pulse is generated by the microprocessor 135 which is then inverted and turned into a precision analog pulse that is amplitude and slew-rate controlled. The leading edge of the drive pulse and the sample and hold (S/H) pulse are synchronous, while the trailing edge of the S/H pulse latches the outputs of the charge amps which is a transient pulse caused by the drive pulse.

The magnitude of the charge amp outputs are proportional to the capacitance between the drive plate and the sense plate. The charge amps 131 integrate and amplify the signal emanating from the sense plate 300. The amplifier/buffer 133 stage has a typical gain of 30 but may be a much larger or smaller value depending on plate size and dielectric thickness. The buffer has a low impedance output necessary to drive the A/D convertor located in the microprocessor 135.

The drive plates 100 are driven by a short, negative-going pulse; for example, a pulse. Only one drive signal is active at a time at the output of the drive pulse mux so that an array of sensors can determine which sensor node is active. The charge amps 131 integrate the charge from the sense plates and produce a positive going pulse that is captured by the S/H circuits 132 which may be implemented with CMOS switches, a capacitor and a buffer/amplifier.

The sample-and-hold pulse generated by the micro 135, which may be on the order of 600 nS, preferably starts the same time as the drive pulse and goes low ~600 nS later. The voltage out of the each S/H circuit 132 600 nS from the start of the drive pulse is applied to each respective buffer amp 133. Each buffer amp has a gain of approximately 30 but can be other values depending on the size of the drive and sense plates. Capacitance values are converted to voltages with the charge amplifiers, S/H and buffer amps. The microcontroller sends these values to a personal computer or other utilization device via a standard interface such as a USB port or wireless communications.

In FIG. 13, whereas lateral displacements may be sensed through straightforward changes in capacitance, with moment sensing, the outputs of the two A, B channels are analyzed in a differential manner, such that with no moment applied, a zero output will be seen. A moment in one direction will cause a positive output approximately proportional to the applied force. A moment in the other direction will cause a negative output approximately proportional to the applied force. In practice, however, the moment is not directly proportional to overlap area due to a trigonometric function. The overlap area is the cosine of a very small angle. Given that the dielectric material may be very thin, (i.e., on the order of 0.005" to 0.015"), the applied moment will not cause a very large rotational shift. This error can be eliminated through appropriate calibration, applying various moments and storing the resultant values in memory. For example: cosine 0=1; cosine 0.1=0.995; cosine 0.2=0.980; cosine 0.3=0.955; and so on.

Figure 14:
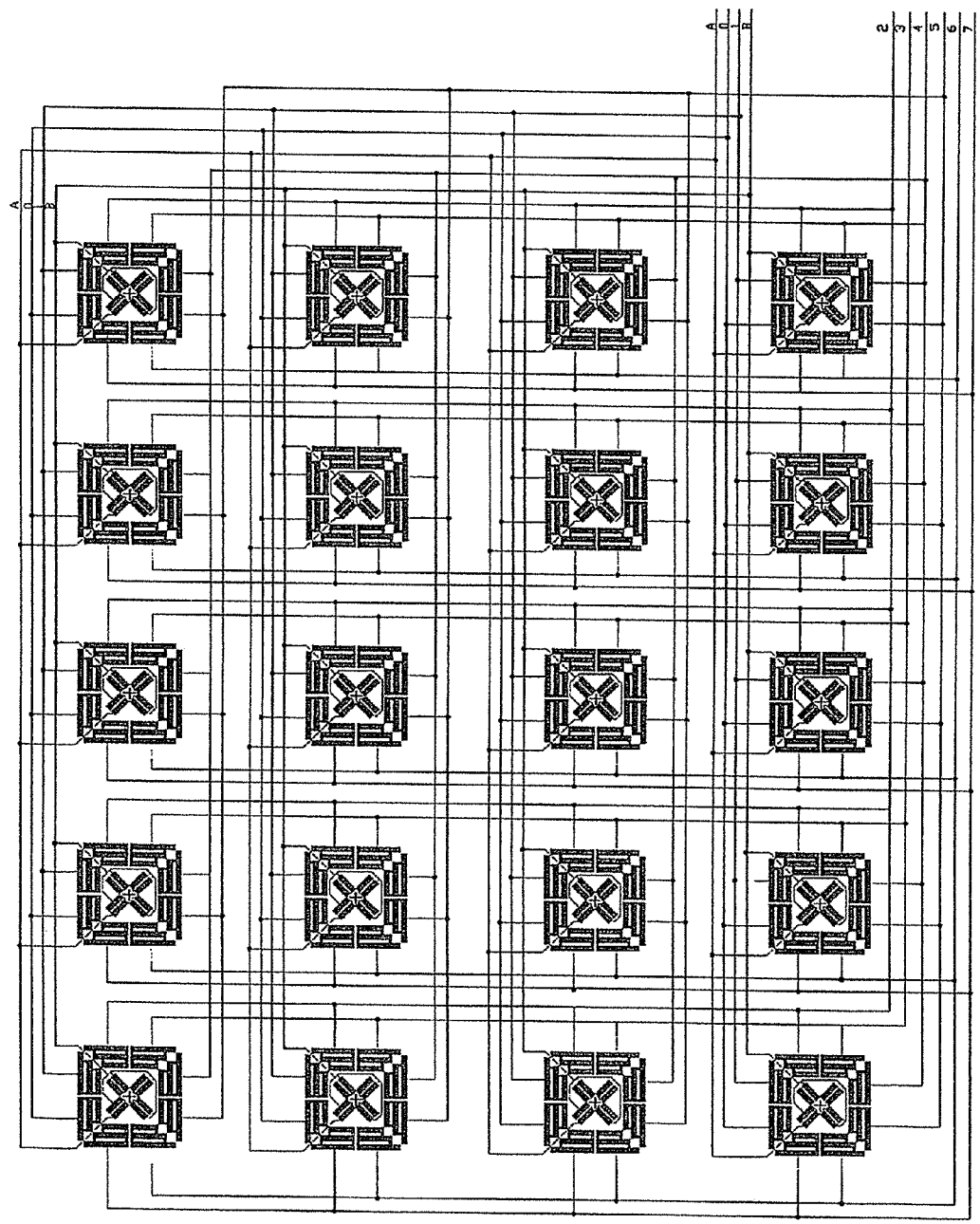
FIG. 14 is a block diagram depicting an array of sensors, each having a full 3-axis/6 DOF (degrees of freedom) capability.
Figure 15:
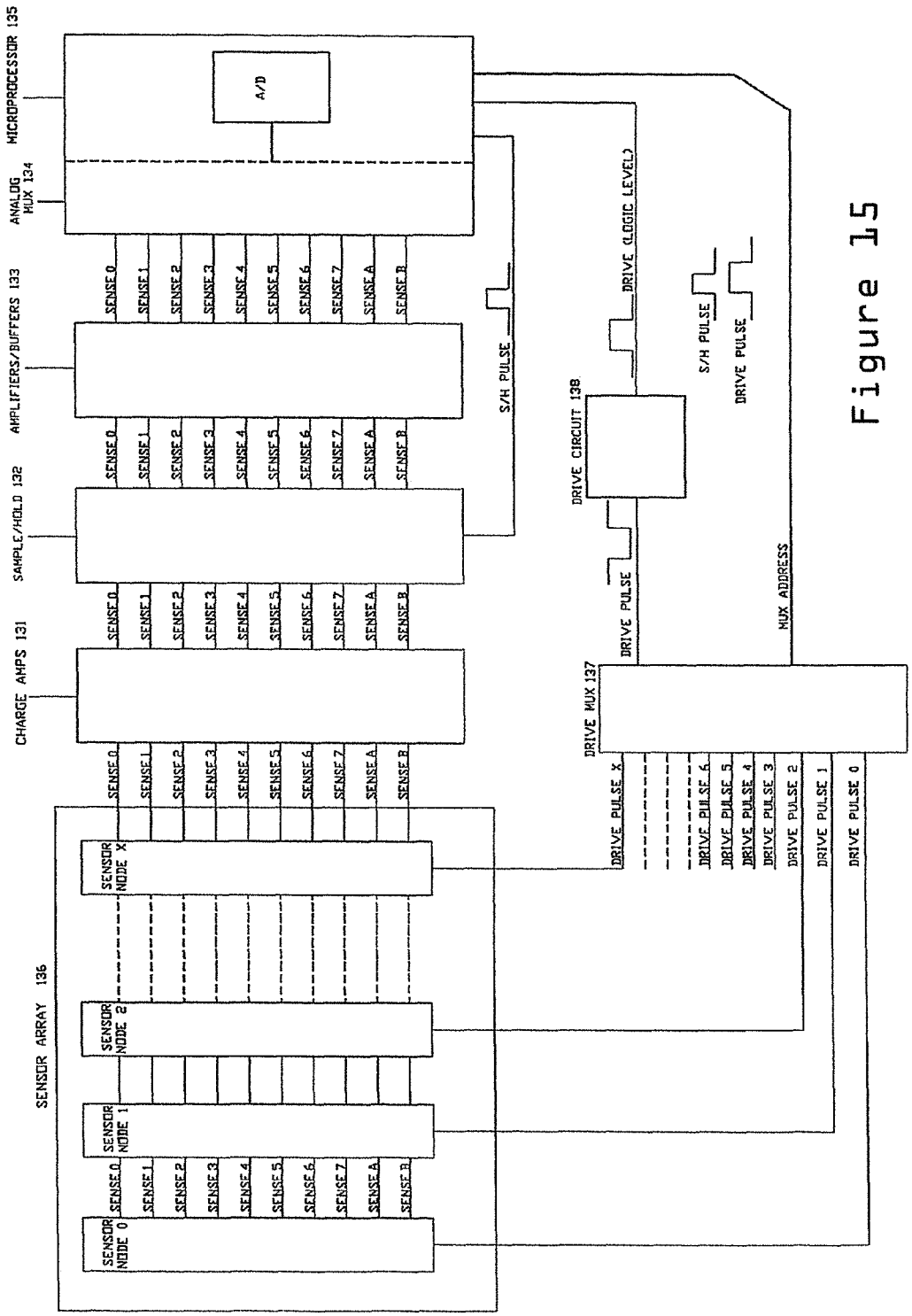
FIG. 15 is a block diagram showing how all of the plates denoted by a single number are tied together and go to one charge amp.
Figure 16:
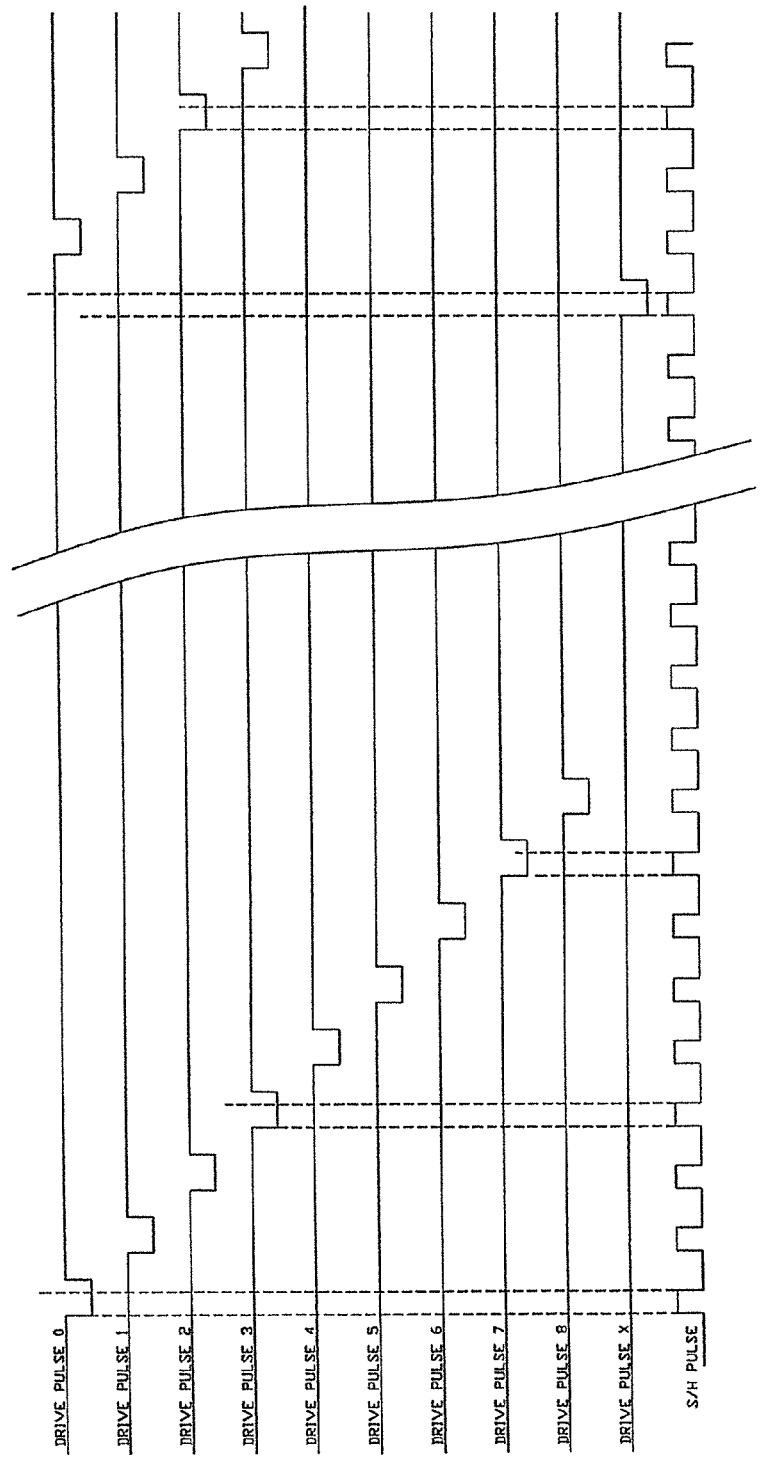
FIG. 16 shows pulse timing such that only one drive pulse is active at one time, allowing the sensor sense plates to be tied together and yet not causing crosstalk.

FIG. 14 is a block diagram depicting an array of sensors, each having a full 3-axis/6 DOF (degrees of freedom) capability. The figure shows a 4×5 node array of the complex sense plates that can detect X, Y, and Z moments and forces. All of the plates denoted by a single number such as 3 are tied together and go to one charge amp 131 in the associated block diagram of FIG. 15. Note that in this configuration, as shown in the drive trains of FIG. 16, only one drive pulse is active at one time, allowing the sensor sense plates to be tied together and yet not causing crosstalk. The other plates in the array that do not have an active drive plate are floating. The charge amps will see the capacitance only from the sense plates with an active drive pulse.

The embodiments described above, including the full 3-axis/6-DOF implementations, may be used in numerous applications, including measurement apparatus associated with prosthesis fitting, testing and monitoring, as discussed in co-pending U.S. patent application Ser. No. 13/663,072, the entire content of which is incorporated herein by reference. Indeed, the cell(s) may be scaled up and down in size to construct different types of sensors, from macroscopic to microscopic in scale.

The technology disclosed herein may also be utilized in a MicroElectroMechanical System (MEMS) based configurations. Such embodiments enable extremely small and hermetically sealed configurations facilitating placement in harsh environments, human/animal bodies, and so forth. Moments and forces can be coupled to the MEMS device using a single or a multiplicity of pins that protrude from the movable plate that is connected to the main body of the MEMS device via silicon springs that are etched, machined or deposited. The pins may also be placed on the opposite side of the MEMS device to connect to parts or surfaces of a structure being monitored. Yet another way to apply forces and moments to the MEMS device is to have a raised land on both the top and the bottom side that can be square, round or some other shape that fits the application. The protrusions can be engaged by the mating parts that are producing the forces and moments.

Figure 17:
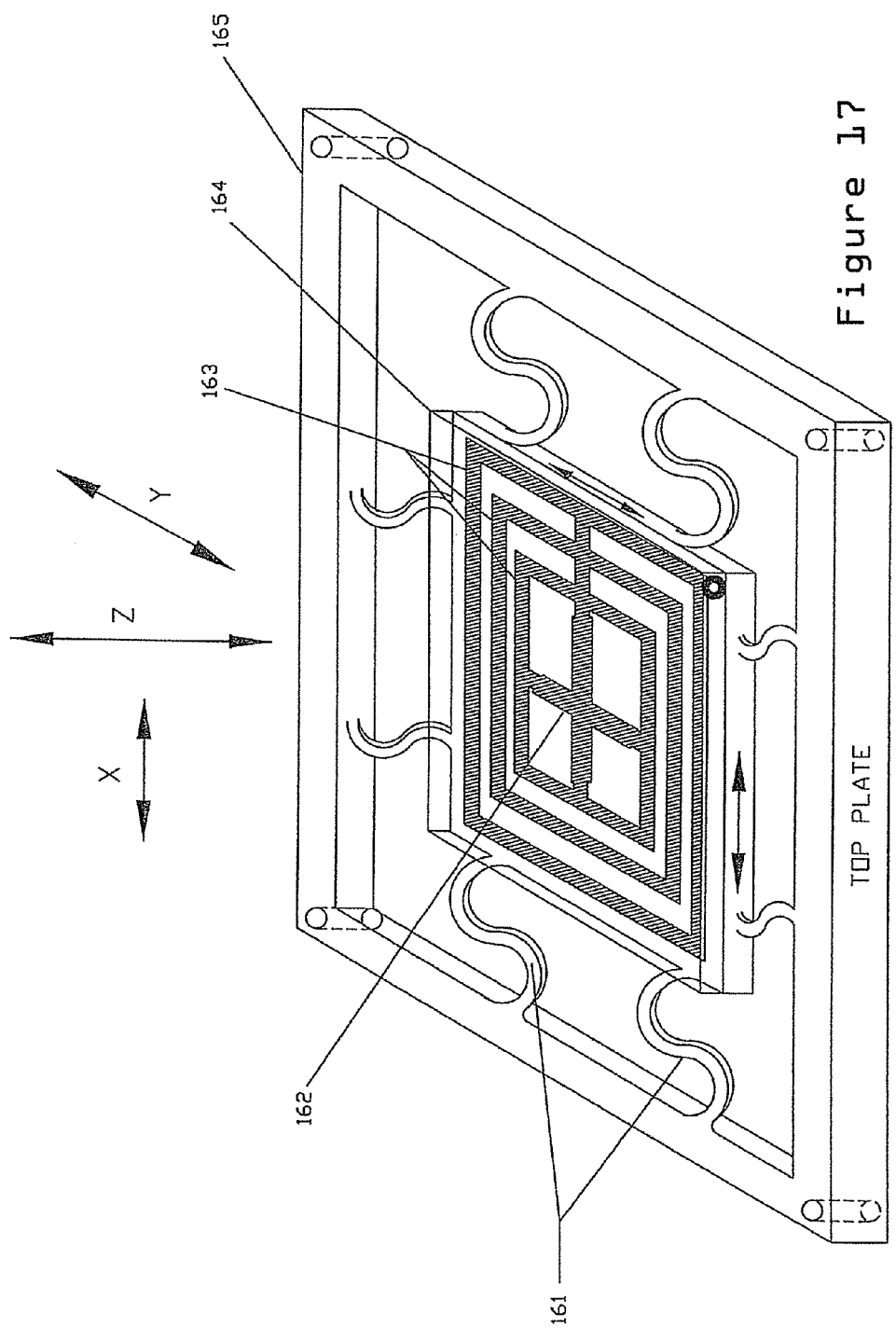
FIG. 17 shows the top plate of a MEMS configuration with a multiplicity of flexures such as "S" shaped beams that can flex in at least 2 axes, preferably in X, Y, and Z.

FIG. 17 shows the top plate 165 of a MEMS configuration with a multiplicity of flexures such as "S" shaped beams 161 that can flex in at least 2 axes, preferably in X, Y, and Z. Pattern 163 comprises the conductive concentric rings of a drive plate positioned on the bottom of this figure. Central pattern 162 is the cruciate shape of the drive plate that is used for Z moments detection and calculations and is also located on the bottom of this figure. Item 164 is the top plate used for transmitting the X, Y and Z forces to a movable element upon which the drive segments are placed.

Figure 18:
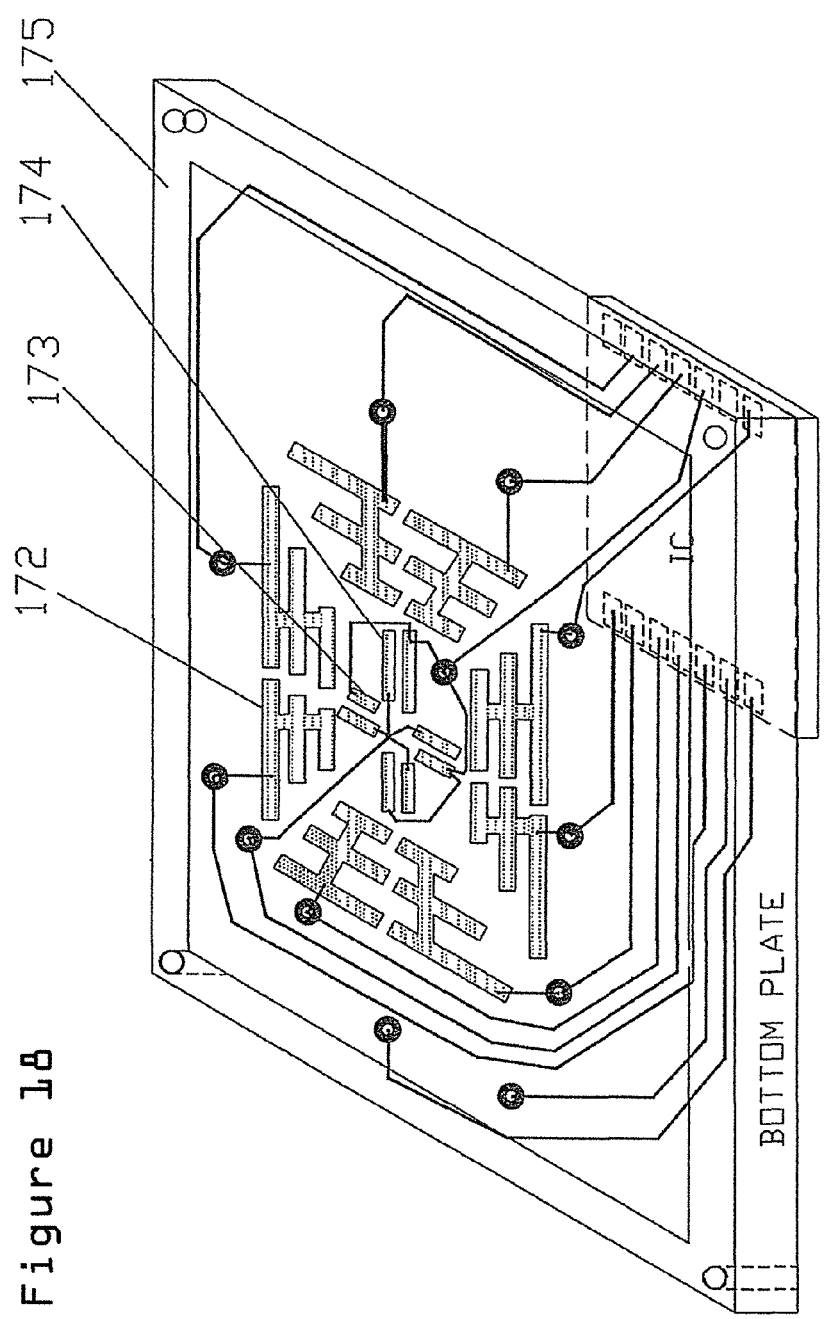
FIG. 18 is an oblique view of a top, sense plate which is positioned relative to the drive plate of FIG. 17.
Figure 19:
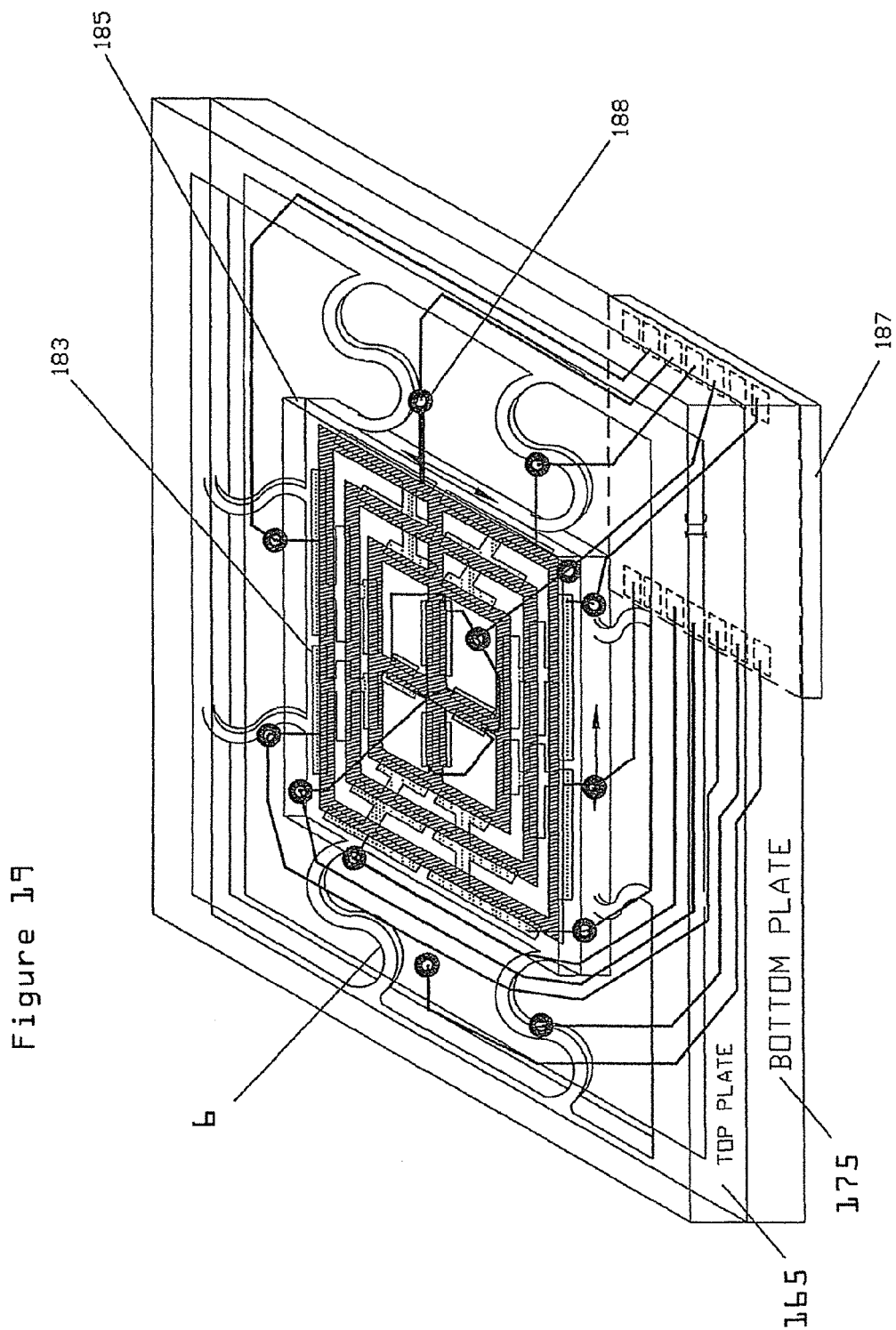
FIG. 19 illustrates the top drive plate of FIG. 17 in juxtaposed registration with the bottom, sense plate of FIG. 18.

FIG. 18 is an oblique view of a top, sense plate which is positioned relative to the drive plate of FIG. 17. As with the configuration depicted in FIG. 10, the electrode pattern includes segmented horizontal, vertical and central cruciate electrodes 172, 173, 174, in this case coupled to a substrate 175. FIG. 19 illustrates the top drive plate of FIG. 17 in juxtaposed registration with the bottom, sense plate of FIG. 18. A raised land 185 may be used to impart forces and moments to the drive plate 165. Numerical reference 183 is a stationary, conductive section of the sense plate. A conductive via 188 is on the bottom plate may be used to obtain signals from one side of the bottom plate to the other.

An integrated circuit 187 such as a custom ASIC is used for generating, sensing and processing the MEMS signals. The IC 187 preferably includes both analog and digital sections to sense sub-picofarad capacitances that may be found in such a small device. The IC contains the requisite charge amplifiers, sigma-delta A-to-D convertors, multiple S/H units, and microcontroller for sensor operation. For wireless, embedded applications, the IC 187 may further a transceiver, and an energy harvesting system for power. IC 187 may include flash memory so that the MEMS sensor can be configured per application. The IC can be an ultra-low power device with a built-in radio transceiver so that the forces and moments can be sensed at a distance using another transceiver. Re-programming can be accomplished over this wireless link using RF or other technologies.

Figure 21:
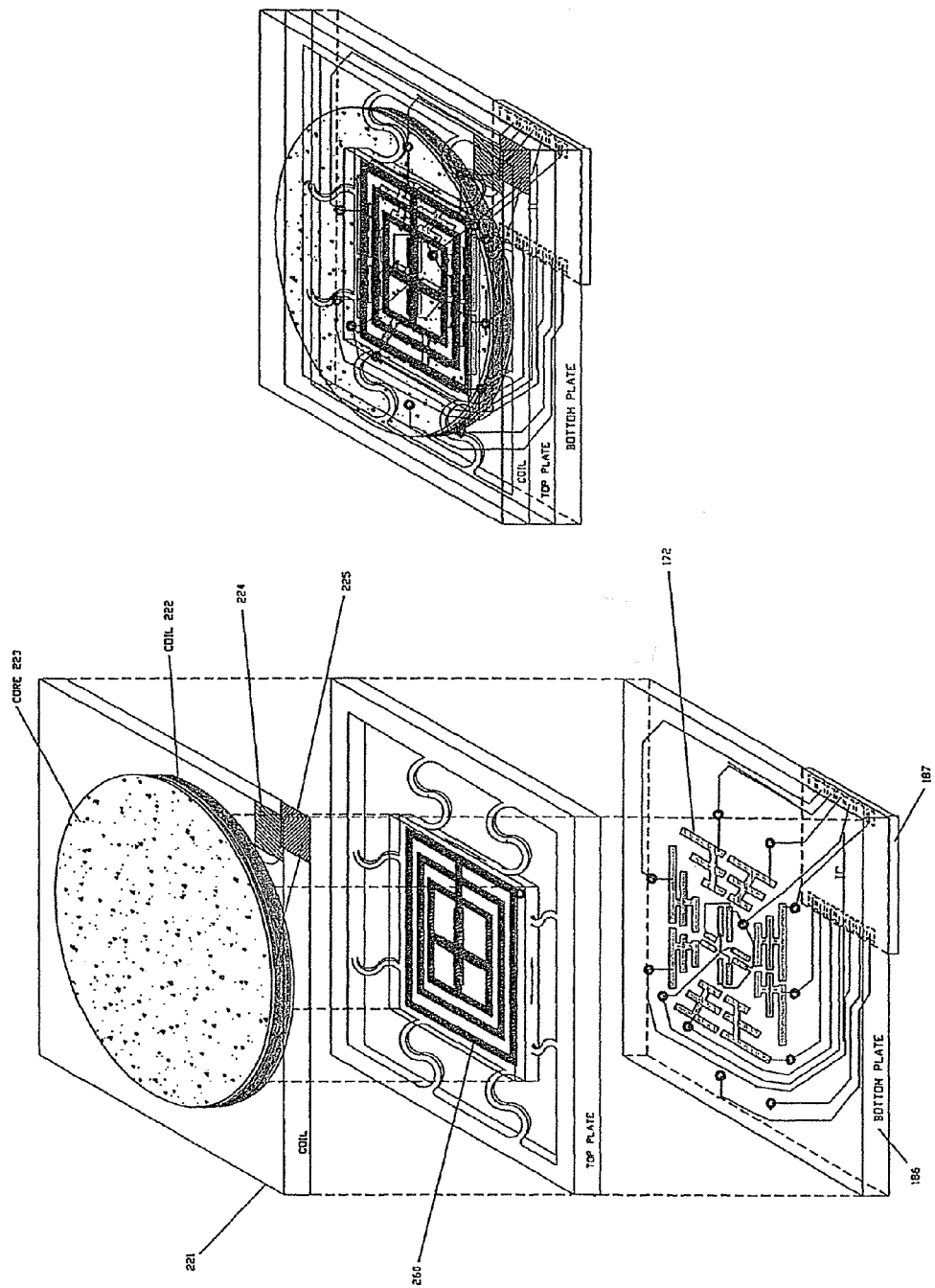
FIG. 21 depicts yet another way to charge up a battery and/or capacitor using several turns of a conductor being part of the MEMS device forming a coil around a core.

The power source may also include a battery, an ultra cap, or a conventional tantalum capacitor for storing energy. Energy harvesting may be used to charge the battery or the capacitor. Yet another way to charge up the battery and/or capacitor is to have several turns of a conductor being part of the MEMS device forming a coil 222 around core 223 depicted in FIG. 21. This coil is the subjected to an electromagnetic field that is generated by some external source and is placed in close proximity to the MEMS device. The AC waveform coming from the coil is rectified, filtered and connected to the battery and or capacitor via some charging circuit. This same coil pick-up can also be external to the MEMS device so that it can be larger, and or be placed close to the skin for better coupling to the external electromagnetic field. The coil may have a core to increase its inductance. A suitable material may be iron, ferrite or some other magnetic material.

Figure 20:
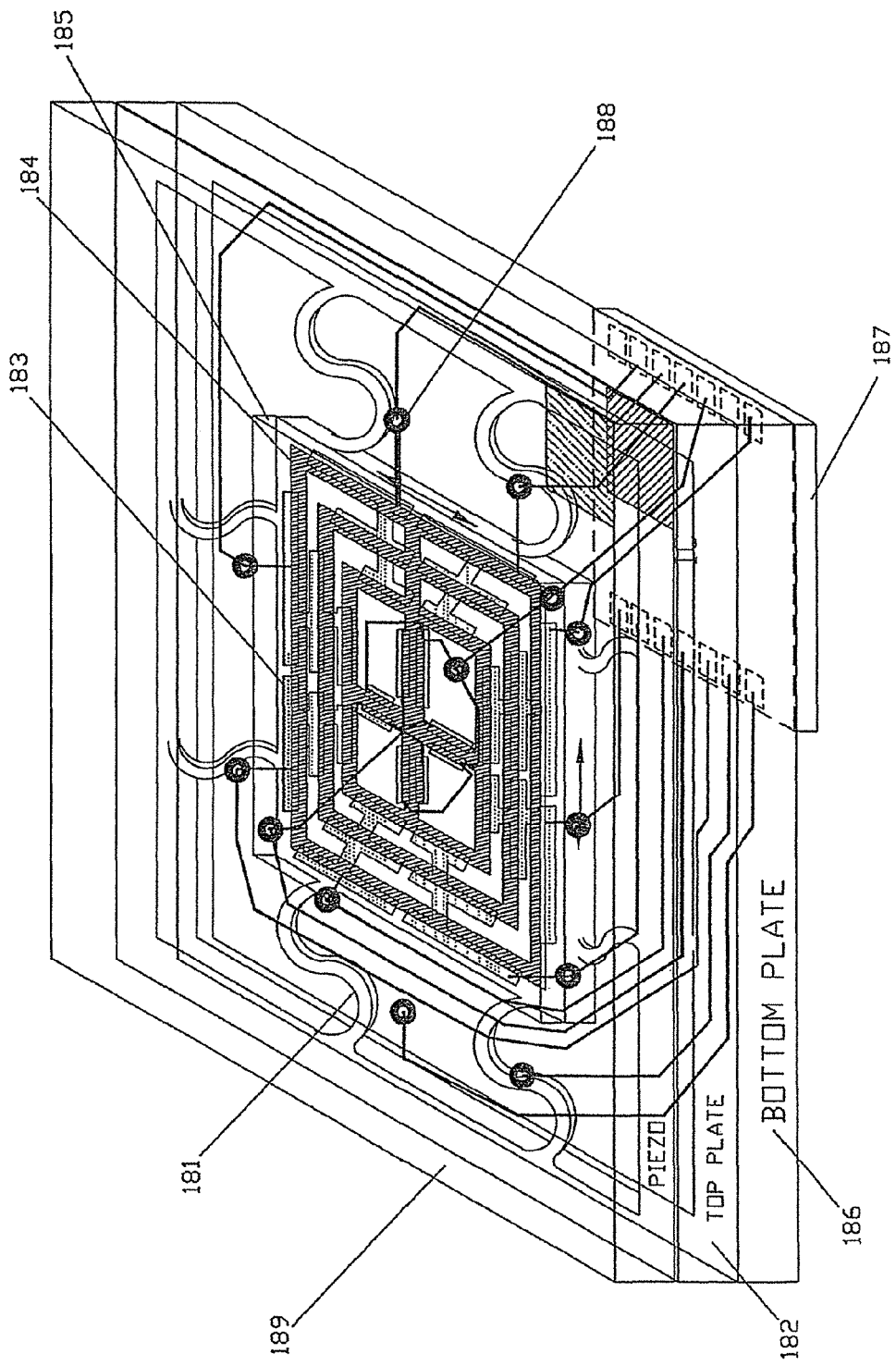
FIG. 20 shows how the MEMS device may be powered through the use of a piezoelectric crystal which may be attached to the land forming part of the drive plate.

Yet another way to power the MEMS device is through the use of a piezoelectric crystal which may be attached to the land forming part of the drive plate as shown in FIG. 20. This would couple all of the forces and moments to the drive plate as well as placing a physical stress on the piezo causing it to produce a voltage. The piezo output will be rectified, filtered and processed using low power, high efficiency circuitry well known in the energy harvesting area. The output will be a fixed DC voltage that powers the MEMS circuitry which includes the analog system, the microprocessor and the transceiver. One type of piezo applicable to the invention is a PZT ceramic having a very high piezoelectric constant.

A MEMS sensor constructed in accordance with the invention may be very small, and hermetically sealed using eutectic bonding, for example. This would enable the device to be placed in a human and or animal body (in vivo) making it possible to measure forces transmitted by bones, muscles, tendons, cartilage and other tissue or body parts. As discussed, moments and forces can be coupled to the MEMS device using a single or a multiplicity of pins, which may also be placed on the opposite side of the MEMS device to connect to parts of the body. Yet another way to transmit forces and or moments to the MEMS device is to place it in between two surfaces such as two bones, a slot cut into a bone, between a tendon and a bone using cell growth to attach to the two MEMS surfaces after they have been treated to support said growth. This treatment to induce growth may include synthetic nucleic acid, or nucleic acid that is harvested from the animal or human that the MEMS device is going to be placed into. See http://www.mate.tue.nl/mate/pdfs/8110.pdf for more data.

The invention claimed is:

1. A multicapacitor sensor system, comprising:
   at least one electrically conductive drive plate pattern, each pattern having a center point, at least two orthogonal electrodes and at least one electrode extending radially outwardly from the center point;
   an electrically conductive sensor pattern disposed in overlying registration with each drive plate pattern, each sensor pattern including at least one electrode parallel to each of the orthogonal electrodes of the drive plate pattern, and at least two electrodes parallel to each electrode extending radially outwardly from the center point of the drive plate pattern; and
   a compressible, elastic dielectric material separating the drive and sensor patterns, whereby the drive and sensor patterns and dielectric define a two-dimensional plane with x and y directions and a z direction perpendicular to the plane, and wherein:
   a) forces applied to the system in the x and y directions are detected by changes in the capacitance between the orthogonal electrodes of the drive plate pattern and the electrodes of the sense plate pattern parallel to the orthogonal electrodes, and
   b) moments applied to the system around the z direction are detected by changes in the capacitance between the electrode extending radially outwardly from the center point of the drive plate pattern and the electrodes of the sense plate pattern parallel to the electrode extending radially outwardly.

2. The multicapacitor sensor system of claim 1, wherein each drive plate pattern includes a plurality of orthogonal electrodes forming a ring around the center point.

3. The multicapacitor sensor system of claim 1, wherein each drive plate pattern includes a plurality of orthogonal electrodes forming a plurality of rings around the center point.

4. The multicapacitor sensor system of claim 1, wherein each drive plate pattern includes a plurality of orthogonal electrodes forming a plurality of generally square rings around the center point.

5. The multicapacitor sensor system of claim 1, wherein each drive plate pattern includes a plurality of electrodes extending radially outwardly from the center point.

6. The multicapacitor sensor system of claim 1, wherein each drive plate pattern includes a plurality of orthogonal electrodes extending radially outwardly from the center point forming a cruciate shape.

7. The multicapacitor sensor system of claim 1, further including electrical circuitry that performs the following functions:
  a) generate electrical pulses to drive the drive plate or plates,
  b) sense, amplify and buffer the voltages induced on the sense plates,
  c) compute changes in the capacitances between the drive and plate patterns, and
  d) determine if any forces or moments have been applied to the system as a function of the changes in the capacitances.

8. The multicapacitor sensor system of claim 1, wherein the electrodes of the sense plate pattern parallel to each of the orthogonal electrodes of the drive plate pattern are formed with a plurality of segments enabling force applied in the z direction and torques around the x and y directions to be detected as a moments, resulting in a 3-axis load cell with 6 degrees of freedom.

9. The multicapacitor sensor system of claim 8, wherein:
  each drive plate pattern includes a plurality of orthogonal electrodes forming a ring around the center point;
  at least eight electrodes of the sense plate pattern parallel to each of the orthogonal electrodes of the drive plate pattern, resulting in a total of at least 10 separate electrically conductive nodes in the sense plate pattern.

10. The multicapacitor sensor system of claim 9, wherein the ring of the drive plate pattern forms a square shape.

11. The multicapacitor sensor system of claim 8, wherein the drive plate pattern includes a plurality of electrodes extending radially outwardly from the center point.

12. The multicapacitor sensor system of claim 8, wherein the drive plate pattern includes a plurality of orthogonal electrodes extending radially outwardly from the center point forming a cruciate shape.

13. The multicapacitor sensor system of claim 8, further including electrical circuitry operative to perform the following functions:
  a) generate electrical pulses to drive the drive plate,
  b) sense, amplify and buffer the voltages induced on the sense plates,
  c) compute changes in the capacitances between the drive and sense patterns, and
  d) determine if any forces and or moments have been applied to the system as a function of the changes in the capacitances.

14. The multicapacitor sensor system of claim 1, further comprising an array of drive and sense plates forming multiple sensor nodes with forces and moments being sensed at each node.

15. The multicapacitor sensor system of claim 8, further comprising an array of drive and sense plates forming multiple sensor nodes with forces and moments being sensed at each node with full 3-axis/6 degree of freedom capability.

16. The multicapacitor sensor system of claim 1, further comprising:
  an array of drive and sense plates forming multiple sensor nodes with forces and moments being sensed at each node; and
  a mathematical map in a computer memory that computes the global forces and moments applied to the array.

17. The multicapacitor sensor system of claim 1, wherein the drive and sense plates form part of a hermetically sealed MicroElectroMechanical System (MEMS) device.

18. The multicapacitor sensor system of claim 8, wherein the drive and sense plates form part of a hermetically sealed MicroElectroMechanical System (MEMS) device.

* * * * *